United States Patent [19]

Adiletta

[11] Patent Number: 5,228,891
[45] Date of Patent: Jul. 20, 1993

[54] REGENERABLE DIESEL EXHAUST FILTER

[75] Inventor: Joseph G. Adiletta, Thompson, Conn.

[73] Assignee: Pall Corporation, Glen Cove

[21] Appl. No.: 817,595

[22] Filed: Jan. 7, 1992

[51] Int. Cl.$^5$ .................................. B01D 46/00
[52] U.S. Cl. ........................ 55/484; 55/523; 55/DIG. 30; 60/311
[58] Field of Search ............. 55/DIG. 30, 484, 523; 60/311

[56] References Cited

U.S. PATENT DOCUMENTS

| | | | |
|---|---|---|---|
| 2,192,968 | 3/1940 | Fieser | 55/486 |
| 3,350,860 | 11/1967 | Grassel et al. | 55/387 |
| 3,380,810 | 4/1968 | Hamblin | 23/288 |
| 4,342,574 | 8/1982 | Fetzer | 55/341 |
| 4,415,344 | 11/1983 | Frost et al. | 55/DIG. 30 |
| 4,416,675 | 11/1983 | Montierth | 55/502 |
| 4,626,265 | 12/1986 | Adiletta | 55/316 |
| 4,645,605 | 2/1987 | Durham | 210/679 |
| 4,652,286 | 3/1987 | Kusuda et al. | 55/523 |
| 4,687,579 | 8/1987 | Bergman | 55/521 |
| 4,704,863 | 11/1987 | Abthoff et al. | 60/311 |
| 4,718,926 | 1/1988 | Nakamoto et al. | 55/523 |
| 4,720,972 | 1/1988 | Rao et al. | 60/274 |
| 4,791,785 | 12/1988 | Hudson et al. | 60/303 |
| 4,801,317 | 1/1989 | Agnew et al. | 55/521 |
| 4,833,883 | 5/1989 | Oda et al. | 60/311 |
| 4,858,431 | 8/1989 | Leonhard et al. | 60/297 |
| 4,866,932 | 9/1989 | Morita et al. | 60/288 |
| 4,872,889 | 10/1989 | Lepperhoff et al. | 55/267 |
| 4,875,335 | 10/1989 | Arai et al. | 60/274 |
| 4,877,433 | 10/1989 | Oshitari | 55/486 |
| 4,895,707 | 1/1990 | Kuhn | 422/177 |
| 4,923,487 | 5/1990 | Bogart et al. | 55/482 |
| 4,936,093 | 6/1990 | Goerlich | |
| 4,948,403 | 8/1990 | Lepperhoff et al. | 55/282 |
| 4,960,449 | 10/1990 | Yonushonis | 55/523 |
| 4,979,364 | 12/1990 | Fleck | 60/274 |
| 5,053,062 | 10/1991 | Barris et al. | 55/282 |
| 5,094,075 | 3/1992 | Berendes | |

FOREIGN PATENT DOCUMENTS

| | | | |
|---|---|---|---|
| 704092 | 2/1965 | Canada | |
| 0194131 | 3/1986 | European Pat. Off. | |
| 45504 | 9/1935 | France | 55/484 |
| 1453653 | 8/1966 | France | 55/484 |
| 56-148607 | 2/1965 | Japan | |

Primary Examiner—Bernard Nozick
Attorney, Agent, or Firm—Leydig, Voit & Mayer

[57] ABSTRACT

A gas filter assembly for removing particulates from the exhaust gas of a diesel engine comprising a housing having an inlet pipe for coupling to the engine and an outlet pipe open to the atmosphere is disclosed. The inlet pipe and the outlet pipe define an exhaust gas flow path. A self-contained filtering means is disposed within the gas flow path. The filtering means includes a plurality of inlet cells, microporous filter elements, filter support elements, and the outlet cells. The components of the filtering means are disposed such that the exhaust gas flows through the inlet cells, then through the microporous filter elements and filter support elements, and finally through the outlet cells. Each of the components of the self-contained filtering means are highly resistant to excessive temperatures, so that the filtering means may be regenerated by heat, which burns off accumulated, typically hydrocarbon, particulates.

9 Claims, 9 Drawing Sheets

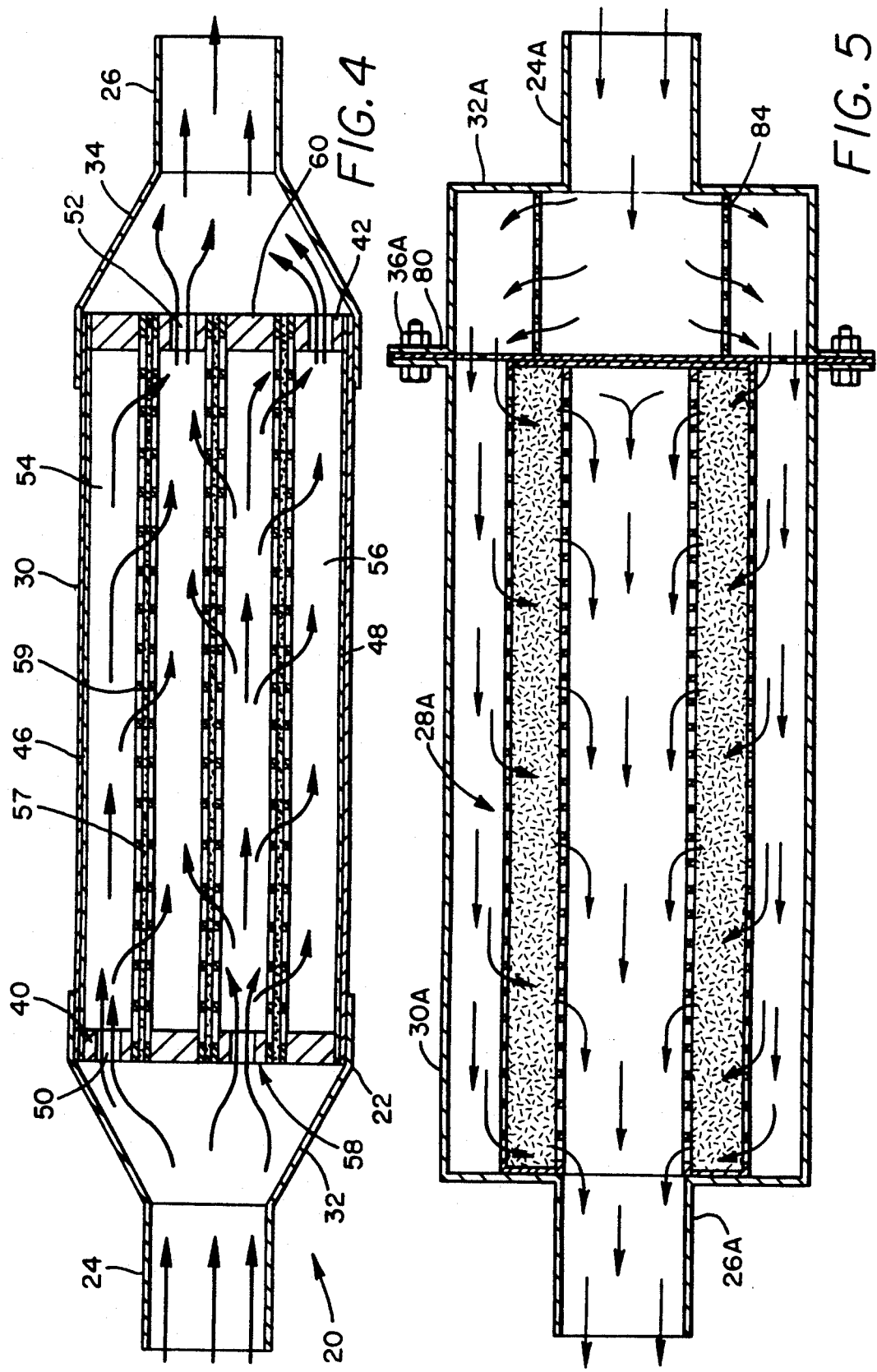

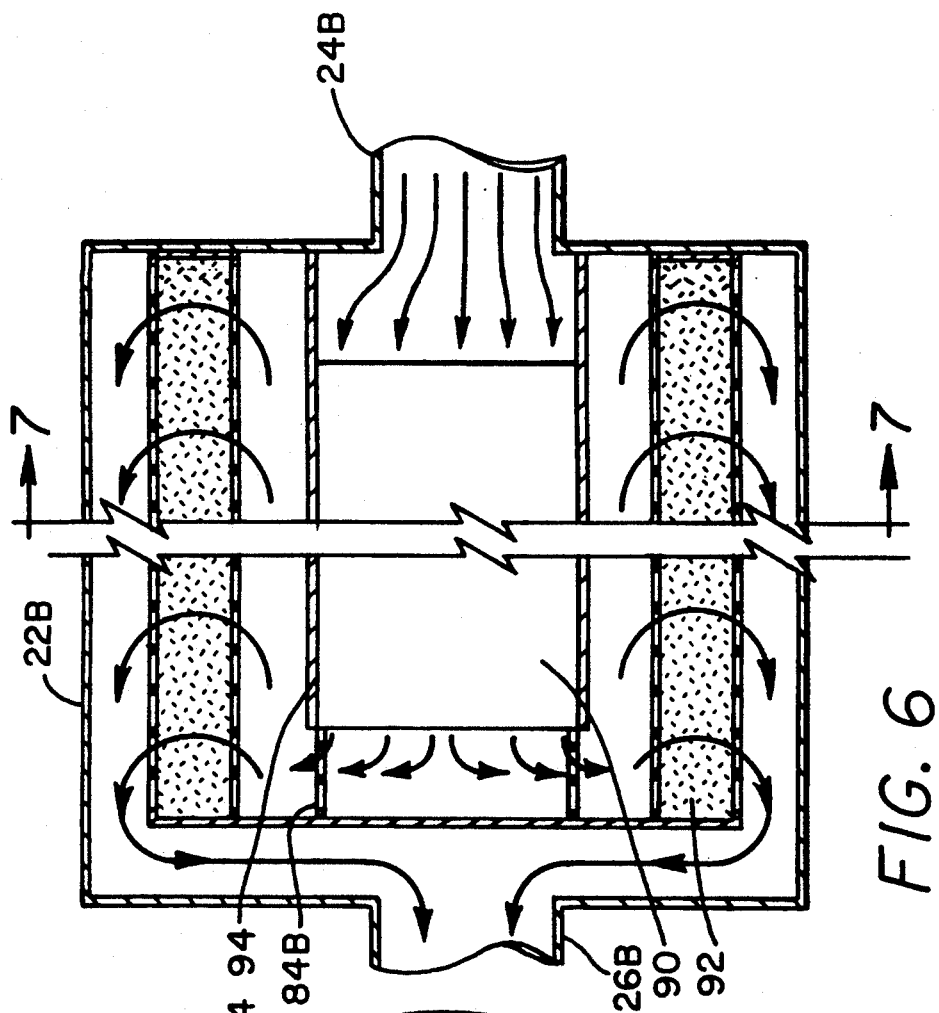
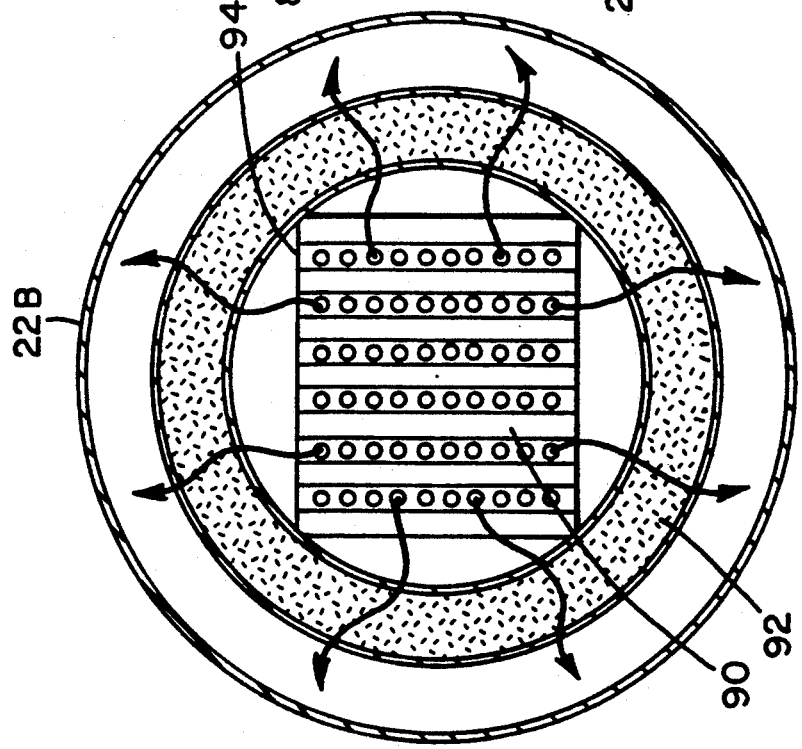
FIG. 6
FIG. 7

REGENERABLE DIESEL EXHAUST FILTER

FIELD OF THE INVENTION

The present invention relates to a filter system for purifying the exhaust gases of an internal combustion engine. In particular, it relates to a regenerating filter for removing particulates from the exhaust gases of a diesel engine.

BACKGROUND OF THE INVENTION

There is an increasing awareness of the health hazards presented by many common air pollutants. Perhaps in response to these concerns, governments are increasingly regulating the exhaust emissions of vehicles. In the United States, Environmental Protection Agency requirements relate to the exhaust of vehicles, rather than the device or method used to control the exhaust. Two predominant methods are currently used to control emissions; they are the utilization of alternative fuels, and solid particulate removal, as with a filter.

In particular, diesel engines, such as those utilized in trucks, buses, and passenger cars, produce a tremendous amount of soot. As there are in excess of 1.2 million diesel-powered vehicles in the United States alone, diesel engines pose a significant air pollution problem. Over the next several years, vehicles powered by such diesel engines must meet more and more stringent regulations. As a result, there is increasing interest in the efficient and effective limitation of emission of particulate material, generally carbon and hydrocarbon particles, from the exhaust gases of diesel engines.

Various types of filtering devices have been proposed to filter diesel engine exhaust. Usually, such devices comprises filter systems which retain and collect the particulates in the exhaust gas. As soot particles are reported to range in size upward from 250 A (0.25 micron), a high efficiency filter is required to effectively filter out such contaminants. A number of filters are known. For example, cellular ceramic filters and honeycomb filters of porous ceramic material, such as those disclosed in U.S. Pat. Nos. 4,872,889 and 4,948,403 to Lepperhoff et al., have been recognized as being useful in trapping particulates from exhaust emissions.

However, particulates retained in the filter generally lead to an increase in the flow resistance in the exhaust and a resultant increase in the back pressure of the exhaust. Excessive back pressure can develop quickly, particularly when high efficiency filters are utilized. This unacceptable increase in exhaust back pressure can lead to an increase in fuel consumption, and, in extreme cases, to engine shut-off or failure. This result is particularly troublesome with truck and bus diesel engines inasmuch as any filter of a practical size would quickly become loaded and develop high back pressure which would result in engine shut-off.

As a result, it necessary to intermittently regenerate the filter to remove the carbon particles from the filter during operation of the diesel engine. This is generally accomplished by providing sufficient heat to combust the particulates. Consequently, filter materials must withstand temperatures of over 600 C (1112° F.) repeatedly. A number of methods of regeneration are known, such as the utilization of electric heating elements, as disclosed in, for example, U.S. Pat. No. 5,053,062 to Barris et al., U.S. Pat. No. 4,791,785 to Hudson et al., and U.S. Pat. Nos. 4,872,889 and 4,948,403 to Lepperhoff et al.

Ceramic honeycomb filter designs are particularly susceptible to rapid development of excessive back pressure. There are a number of additional disadvantages, however, associated with the use of ceramic materials. Ceramic materials, particularly filters, are inherently brittle, and, consequently, subject to fracture from shock and mechanical stresses. Therefore, when ceramic materials are used in filters, it is necessary to design the filters with greater depth thickness than ordinarily desirable. Further, because ceramic materials are fragile and not deformable, it is not feasible to utilize standard engineering edge-sealing, gasketing methods. Ceramics are also costly to manufacture as they are difficult to shape. Additionally, inasmuch as the uniformity of ceramic particles is difficult to control, particularly for sintering and pre-forming, manufacturing quality is difficult to control.

OBJECTS OF THE INVENTION

The general object of the invention is to provide an improved exhaust filter for diesel engines. A more particular object of the invention is to provide a reliable, high efficiency filter which provides a low change in pressure across the filter.

An additional object is to provide an exhaust filter that does not impair engine performance. A related object is to provide an exhaust filter with reduced susceptibility to development of back pressure.

Another object is to provide an exhaust filter that is highly resistant to heat, and is regenerable.

A further object is to provide an exhaust filter of an uncomplicated design that may be easily serviced. A more specific object is to provide an exhaust filter that may be easily assembled and disassembled to facilitate maintenance or replacement of filter elements in the field.

Yet another object is to provide a diesel exhaust purification system which accommodates a large flow of gas but features a small, compact design.

BRIEF SUMMARY OF THE INVENTION

In accomplishing these objects, there is provided an improved diesel exhaust filter having a high efficiency, self-contained filter arrangement disposed within a housing that may be connected in-line with the exhaust system of the vehicle to provide a flow of exhaust gases therethrough. The housing, which may be of any appropriate shape, includes an inlet pipe, which may be connected to an exhaust pipe from the engine, and an outlet pipe, which may be open to the atmosphere. Disposed within the housing is a self-contained filtering means.

In a first embodiment of the invention, the filtering means is a flat filter arrangement having inlet and outlet cells and filter elements compressed between opposite impervious endplates. Exhaust gas enters the inlet cells along the inlet end of the housing, flows through the filter elements, and out of the filter arrangement through the outlet cells to be exhausted to the atmosphere through the outlet pipe. In a second embodiment of the invention, a pleated cylindrical filter is utilized, the exhaust gas flowing from the inlet pipe outward through the cylindrical filter from the interior, or, alternately, inward from the perimeter of the cylindrical filter to its interior, and out of the housing through the outlet pipe. A third embodiment combines the flat and cylindrical filters of the first and second embodiments, respectively, to provide an arrangement where the exhaust gas flows through the flat filters and outward from the interior of the cylindrical filter to its perimeter to be passed to the atmosphere through the outlet pipe. A fourth embodiment of the invention comprises a housing having a rectangular plenum having an open top portion into which seats a topplate having substantially flat and upwardly and outwardly extending sides. This embodiment utilizes a flat filter arrangement, the components of which are compressed between the lower, inner surface of the plenum and the flat surface of the topplate by nuts and carriage bolts that extend through openings in the flat surface of the topplate, the lower surface of the plenum, and the components of the filter arrangement. A fifth embodiment of the invention comprises a similar flat filter arrangement, and housing comprising a plenum having dual components that are secured together along outwardly extending flanges by bolts. Flat plates, each having an outwardly extending pipe are secured to the ends of the plenum to seal the housing.

Each of the filter arrangements utilizes materials that are highly resistant to excess temperature so that the exhaust filter may be regenerated by heat provided by any appropriate method. Further, the filters are extremely high efficiency to provide effective filtration of soot expelled from the diesel engine and provide minimal pressure drop across the filter. The filter arrangements preferably comprise a quartz fiber filter sandwiched between woven wire mesh.

Further, the structure of the exhaust filter is such that it may be easily disassembled to facilitate service, even after the device has been installed on a vehicle. The housing includes a plenum and at least one removable endplate. Once the endplate has been disassembled from the plenum, the self-contained filter arrangement may be removed to permit replacement or further cleaning. The filter arrangement may then be reinserted and the housing easily reassembled.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 4 is a cross-sectional view of the filter system taken along line 4—4 in FIG. 1;

FIG. 5 is a cross-sectional view of an alternate embodiment of the filter system shown in FIG. 1;

FIG. 6 is a cross-sectional view of an alternate embodiment of the filter system shown in FIG. 1;

FIG. 7 is a cross-sectional view of the filter system taken along line 7—7 in FIG. 6;

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DESCRIPTION OF THE PREFERRED EMBODIMENT

Figure 1:
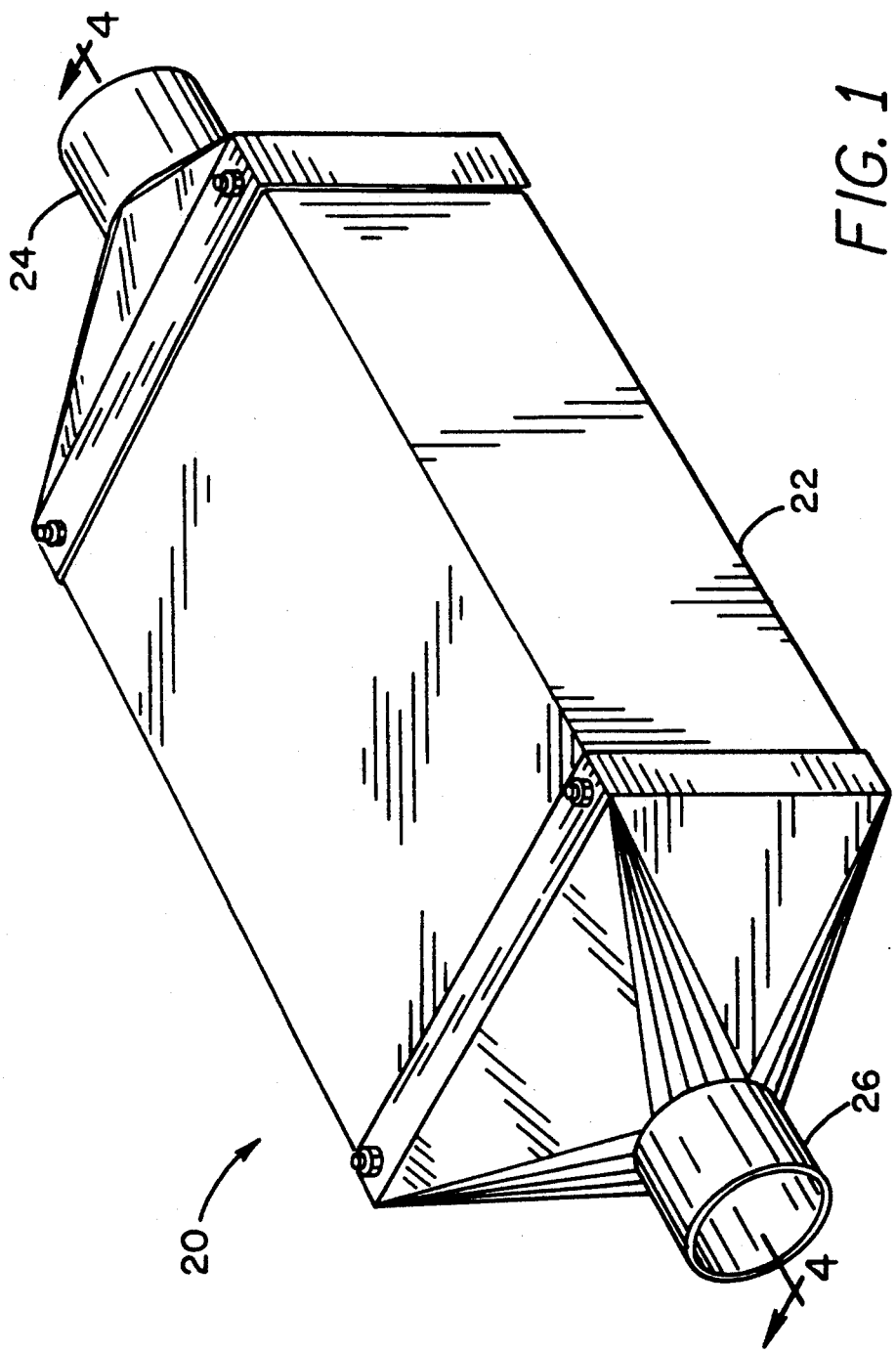
FIG. 1 is a perspective view of an exemplary filter system embodying the invention.

Turning now to the drawings, there is shown in FIG. 1 an exhaust filter system 20 for use in the exhaust system of a diesel powered vehicle. The filter system 20 includes a housing 22 having an inlet pipe 24 and an outlet pipe 26. The housing 22 may be connected in-line with the exhaust system of a diesel powered vehicle to provide a flow of exhaust gases from the engine into the inlet pipe 24, through the housing 22, and out of the outlet pipe 26 to the atmosphere. In a currently preferred embodiment, the inlet and outlet pipes 24, 26 are on the order of two inches, or fifty millimeters in diameter.

Figure 2:
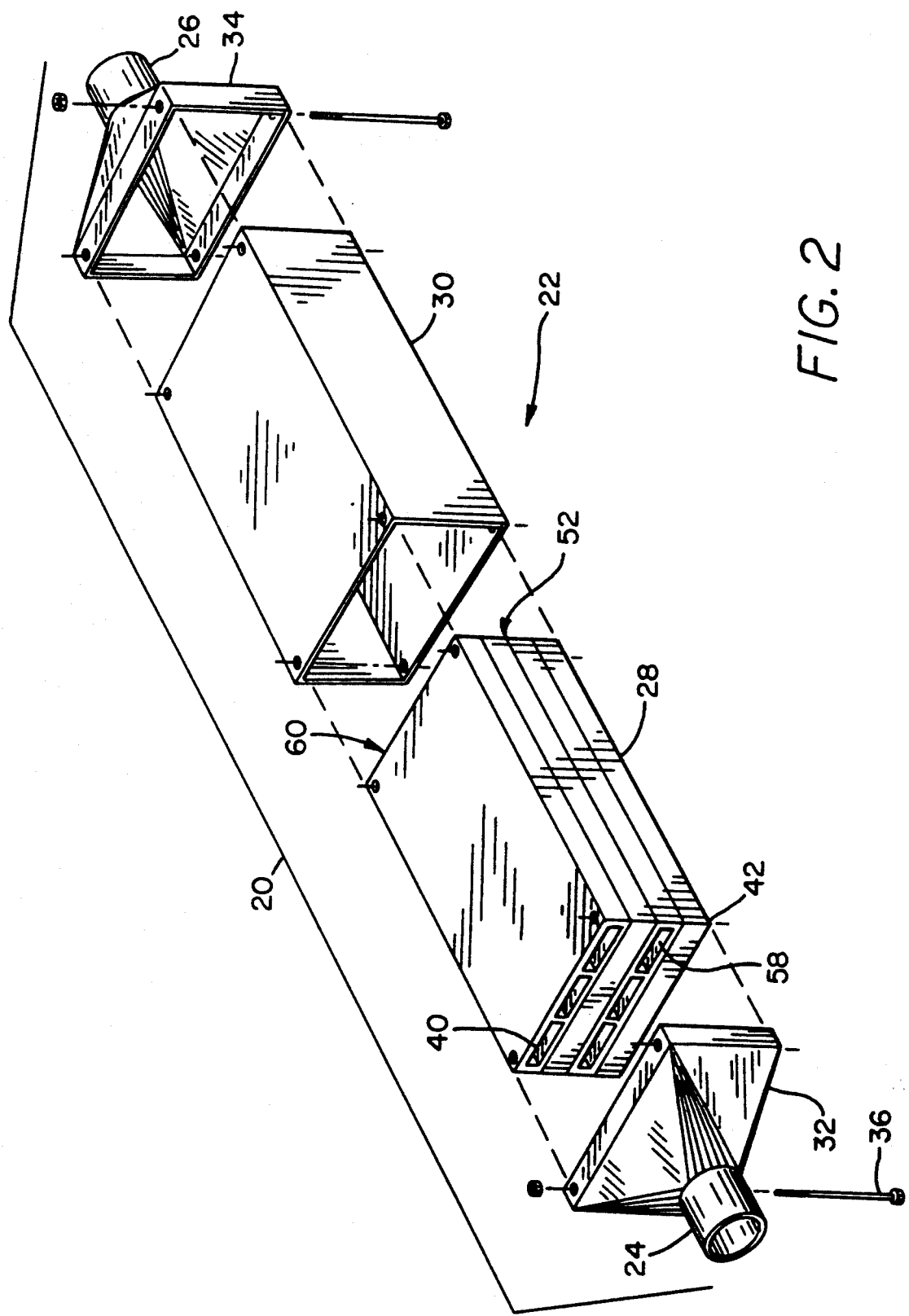
FIG. 2 is an exploded view of the filter system of FIG. 1.

In accordance with one aspect of the invention, there is provided a self-contained filter arrangement 28 in line with the gas flow through the housing 22, as shown in the exploded view in FIG. 2. The filter arrangement 28 provides high efficiency filtration o the gases passing therethrough, while providing a relatively low pressure drop across the filter system 20. Further, the filter arrangement 28, and, indeed, the filter system 20 is comprised of materials that are highly resistant to heat required for the regeneration process.

In the embodiment shown in FIGS. 1-4, the housing 22 comprises a plenum 30, which is generally configured as a rectangular parallelpiped. It will be appreciated, however, that the housing 22 as well as the self-contained filter arrangement 28, may be of a suitable alternate geometric design. In the preferred embodiment, the inlet pipe 24 and the outlet pipe 26 are formed integrally with the endplates 32, 34, respectively. The endplates 32, 34 are provided with flanges 33, 34 for coupling the endplates 32, 34 to the plenum 30 by way of bolts 36 or other suitable fastening devices, which extend through the flanges 33, 34 and the plenum 30. Accordingly, those skilled in the art will appreciate that the housing 22 may be easily disassembled for maintenance or replacement of the filter arrangement 28, even after installation. Although the housing 22 may be of any appropriate dimensions, a currently preferred design is on the order of eight inches by fifteen inches by six inches. However, for larger engines, or different vehicles, these dimensions may be effectively altered to different proportions to fit the space provided.

Further, in order to facilitate installation of the filtering system 20 on the vehicle, the housing 22 may be provided with mounting brackets (not shown). The mounting brackets may be formed integrally with one of the components of the housing 22, or may be formed as separate components, which may be then be coupled to the housing 22.

Figure 3:
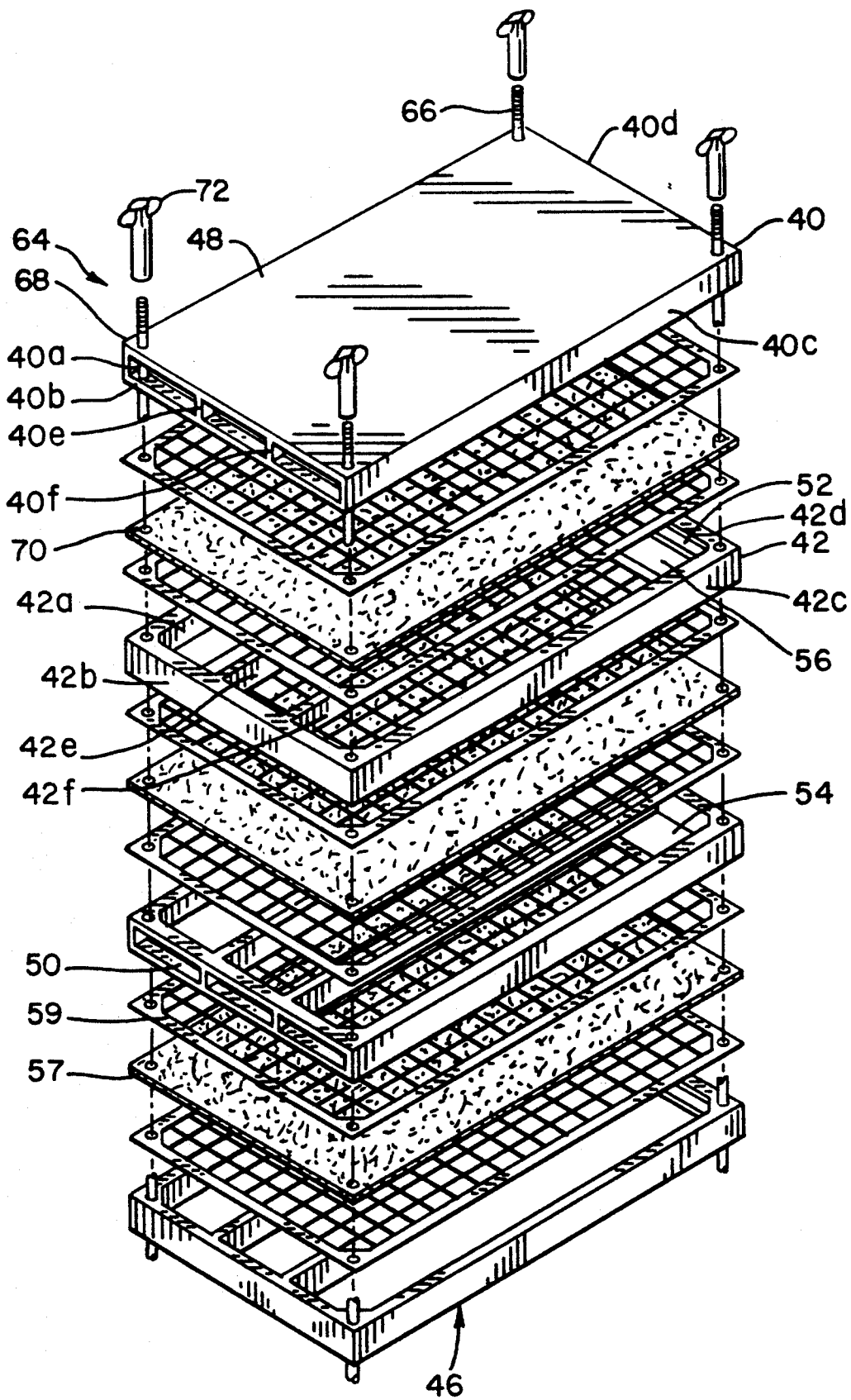
FIG. 3 is an exploded view of a portion of the filter arrangement of FIG. 2.

The self-contained filter arrangement 28 is shown in greater detail in FIG. 3. The filter arrangement 28 is configured as a rectangular parallelpiped and generally comprises an assembly of inlet cells 40, outlet cells 42, and filter elements 44 compressed between opposite impervious endplates 46, 48, which may be integrally formed with the inlet and outlet cells 40, 42, as shown in FIG. 3. The inlet and outlet cells 40, 42, which may be identical to each other, are relatively thin structures.

Each cell 40, 42 includes four frame members 40a-40d, 42a-42d joined in a rectangular frame and a number of support members. In the embodiment illustrated in FIG. 3, each cell 40, 42 includes two support members 40e-40f, 42e-42f connected between opposite frame members 40b, 40d, 42b, 42d. However, any number of support members arranged in any appropriate configuration or geometry may be utilized. Small cells may not require support members.

For both the inlet and outlet cells 40, 42, one of the opposite frame members 40a, 42a contains several apertures 50, 52, which interconnect the exterior of the cell 40, 42 and the interior spaces 54, 56 between the frame and support members 40a-40f, 42a-42f. In the embodiment shown in FIGS. 2-4, the apertures 50, 52 are of a rectangular shape. The rectangular shape provides highly efficient air flow through the cells 40, 42. It will be appreciated, however, that the apertures 50, 52 may be of any appropriate shape.

Likewise, the cells 40, 42 may be fabricated by any appropriate method; for example, the cells 40, 42 may be milled, machined, or cast. According to one low cost method, the cells 40, 42 may be flame cut or machined from flat sheet metal. The apertures may then be drilled in one of the frame members. Another low cost method is to cast the cells in steel or iron.

The inlet and outlet cells 40, 42 are distributed alternately within the filter arrangement 28 with the frame and support members 40a-f of the inlet cells 40 lying opposite the frame and support members 42a-42f of the outlet cells 42, respectively. The inlet and outlet cells 40, 42 are further arranged so all of the inlet apertures 50 and none of the outlet apertures 52 open onto one surface of the filter arrangement 28, defining an inlet surface 58 facing the endplate 32, as shown in FIG. 2. In the exemplary filter system 20, all of the outlet apertures 52 open onto the opposite surface of the filter arrangement 28, defining an outlet surface 60 facing 180 degrees from the inlet surface 58. Alternately, the outlet apertures 52 may open onto a side surface or surfaces of the filter arrangement 28, or any appropriate combination thereof, so long as the inlet apertures 50 are sealed from the outlet apertures 52.

Returning now to FIG. 3, disposed between the inlet and outlet cells 40, 42, the filter elements 44 each comprise one or more layers of a microporous filter 57 for removing particulate contaminants, e.g., carbon and hydrocarbon particles. The filters 57 are exposed to excessive temperatures, as well as hydrocarbons, chlorides, and acid forming exhaust. Consequently, the filter material must be highly resistant to high temperatures and chemical deterioration. A variety of microporous filter materials or combinations thereof are suitable for use in the filter element 44, including ceramic fibers, porous metal fiber, or porous metal powder. Such minerals as high purity silica or borosilicate -E glass, powdered metal alloys, boron, and carbon fibers, as well as other synthetic fibrous or matrix-forming materials may likewise be used. It will be appreciated, however, that the filter medium utilized must provide a high efficiency filter, and be able to withstand repeated heating to high temperatures.

The currently preferred filter 57 comprises quartz fiber, which is able to withstand high temperatures, and has a high efficiency. The currently preferred filter 57 utilizes quart fibers such as Manville Corning type 104, 106, 108, 110 grades, or blends thereof. This filter is advantageous in that it blends fibers from under one-half micron in diameter to four microns into a highly porous sheet with low air resistance, while retaining integrity without the addition of binders. Further, these quartz fibers have melting points over 2500° F., and a wide range of chemical resistance. It will likewise be appreciated that alternate filter arrangements may be utilized. For example, one or more grades of filters may be utilized to act as a prefilter. Such arrangements may serve to extend the life of the filters.

Further, support screens 59 may be provided adjacent the microporous filters 44 in order to provide additional support thereto. A currently preferred embodiments of the invention utilize a woven wire mesh with metal fibers, or a sintered, woven mesh, such as RIGI-MESH, a product available from Pall Corporation. A porous metal media, such as PMM, also available from Pall Corporation, commercial 100 mesh, alloy, or stainless steel may likewise be suitable. Other support materials may also be suitable as support screens 59, so long as they are able to withstand extremely high temperatures and its use does not result in rapid development of excessive back pressure.

The impervious endplates 46, 48 are preferably fashioned from sheet metal to provide additional structural integrity. Each endplate 46, 48 is located adjacent an inlet or outlet cell, 40, 42, preferably with a gasket or other supplemental sealant disposed between them.

To compress the filter elements 44 between the inlet and outlet cells 40, 42 and to provide structural integrity to the self-contained filter arrangement 28, the endplates 46, 48 are disposed on opposite ends of an interconnecting frame assembly 64. While a variety of interconnecting frame assemblies 64 may be suitable, including a spring biased clamping assembly, in the exemplary exhaust filter system 20, the interconnecting frame assembly 64 comprises tie rods or carriage bolts 66 running through holes 68 in the corners of the cells 40, 42 and endplates 46, 48 and through cut-outs or holes 70 in the corners of the filter elements 44. Wing nuts 72 ar threaded onto the threaded ends of the carriage bolts 66 and may be tightened to provide the desired compression.

Gaskets may be provided between the filter elements 44, the support screens 59, and the inlet and outlet cells 40, 42 to eliminate or minimize leakage. However, the fine fiber materials of the filter elements 44 and openings in the mesh support screen 59 may seal together in a manner that prevents leakage, thus eliminating the need for gasket materials in these locations.

A gasket 74 is disposed between the plenum 30 and the filter arrangement 28 to prevent leakage of the air from between them. The gasket 74 may also dampens vibrations and noise. The gasket may be formed of any suitable high temperature material, including quartz sheets, magnesium fiber, or other mineral compositions. Alternately, the gasket 74 may be a commercial high temperature metallic-type gasket, such as, for example, the type available from Flexetallic Company. Likewise, the gasket may be constructed of any appropriate cross-section. For example, metal gaskets may be constructed of a ">" cross-section, wherein the deflection of the open end will create a self-adjusting seal between the two surfaces. Such an "elastic" metal seal would also accommodate variations of manufacturing tolerances of the components.

As shown in FIG. 4, from the inlet apertures 50, the exhaust flows generally parallel to the adjacent filter elements 44 into the interior spaces 54 of the inlet cells 40. It then changes direction and passes through either of the adjacent filter elements 44 where particulate contaminants are removed. After passing through the filter elements 44, the purified air flows into the interior spaces 56 of the outlet cells 42 and again changes direction, flowing generally parallel to the adjacent filter elements 44 through the outlet apertures 52.

The air is evenly distributed along the filter elements 44 as it flows generally parallel to the filter elements 44. The air then flows substantially perpendicularly through the filter elements 44. In this way, particulates are substantially evenly distributed along the filter elements 44.

The filter arrangement 28 may include a large number of filter elements 44, and, therefore, present a large filtering area, in a relatively small space. Further, as the adjacent frame members and filters elements 44 provide sufficiently large contact area, leakage of air between the frame members and the filter elements 44 is prevented when the assembly of cells 40, 42 and filter elements 44 is compressed by tightening the wing nuts onto the carriage bolts 66. Thus no gaskets or supplemental sealants are required between the filter elements 44 and the inlet or outlet cells 40, 42.

It will be appreciated by those in the art that the self-contained filter arrangement 28 is easy to service. With either of the endplates 32 or 34 removed, as explained above, the self-contained filter arrangement 38 may be easily removed from the plenum 30. One or more of the filter elements 44 may be removed and cleaned or replaced simply by loosening the wing nuts 72 on the carriage bolts 66. The flexible filter elements 44 may be removed from the filter arrangement 28 by simply loosening the wing nuts 72, rather than completely removing them, inasmuch as the corners of the filter elements 44 have cutouts 70, rather than holes. Once the filter elements 44 have been reinserted in the filter arrangement 28, the wing nuts 72 are than tightened onto the carriage bolts 66 until the filter elements 44 are again adequately compressed against the inlet and outlet cells 40, 42.

An alternate embodiment of the invention is shown in FIG. 5. In this embodiment, the housing 22A comprises a generally cylindrical shaped plenum 30A to which the inlet endplate 32A is secured by bolts 36A along an outwardly extending flange 80. The self-contained filter arrangement 28A is likewise of a generally cylindrical shape. In order to retain the filter arrangement 28A in an appropriate position within the housing 22A, post spacers 84 are provided along the inlet side of the housing 22A. It will be appreciated that the incoming exhaust flows into the housing 22A through the inlet pipe 24A, past the post spacers 84, and through the filter arrangement 28A, and out of the outlet pipe 26A.

The cylindrical filter arrangement 28A is preferably of pleated design, sandwiching a quartz filter medium between alloy mesh supports. Preferably, the filter medium will be Tissuquartz TM, sandwiched between stainless steel 40-60 mesh, of the types available from Pall Corporation.

A third embodiment of the invention, which is shown in FIGS. 6 and 7, provides a combination of a flat filter 90, as in the first embodiment, and a cylindrical filter 92, as with the second embodiment in a single exhaust filter system. The flat filter 90 may be supported on a flat frame 94 within the housing, while the cylindrical filter 90 may be held in position by the post spacers 84B. It will thus be appreciated, that air enters the housing 22B through the inlet pipe 24B, passes through the flat filter 90 and the cylindrical filter 92, and passes out of the housing 22B through the outlet pipe 26B to the atmosphere. As with the embodiments above, the housing 22B may include endplates that may be secured to the plenum by any appropriate method.

Figure 8:
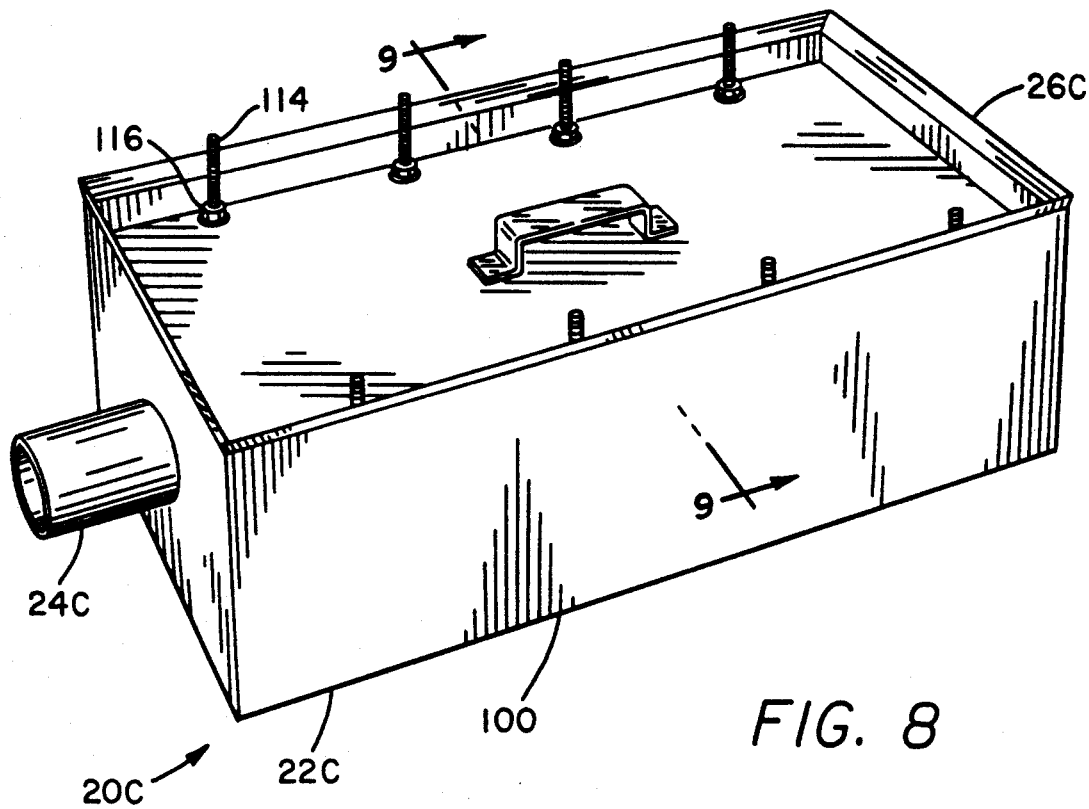
FIG. 8 is a view of an alternate embodiment of the embodiment of the filter system shown in FIG. 1.

A fourth embodiment of the invention is shown in FIGS. 8-11. As shown in FIG. 8, the filter system 20C includes a housing 22C having an inlet pipe 24C and an outlet pipe (not shown). As shown more clearly in FIG. 9, the housing 22C comprises a plenum 100 having a rectangular box shape with an open top. The housing 22C further comprises a topplate 102 having a flat surface 104 and upwardly and outwardly extending sides 106. The lower surface 108 of the plenum 100 and the topplate 102 are provided with corresponding holes 110, 112 through which tie rods or carriage bolts 114 may be inserted. Nuts 116 may then be tightened onto the bolts 114 to tighten the topplate 102 onto the plenum 100 and secure the components together. Those skilled in the art will appreciate that as the topplate 102 is pressed downward within the open top of the plenum 100, the upwardly and outwardly extending sides 106 of the topplate 102 will form a seal between the plenum 100 and the topplate 102.

Figure 10:
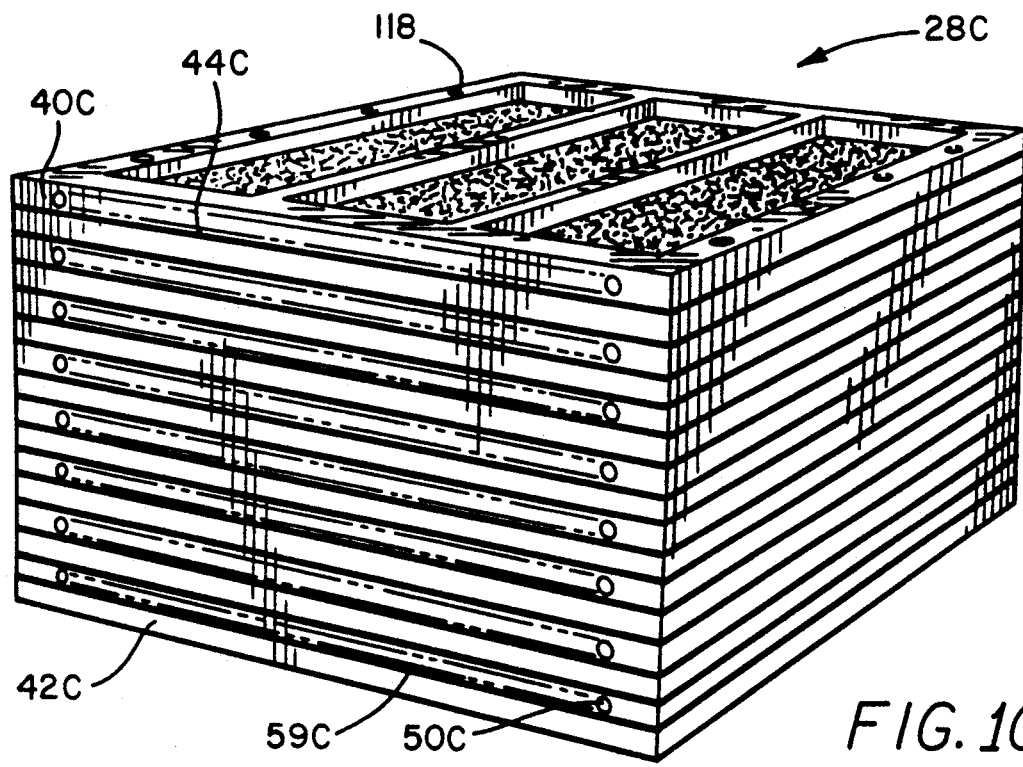
FIG. 10 is a perspective view of the filter arrangement of FIG. 9.
Figure 11:
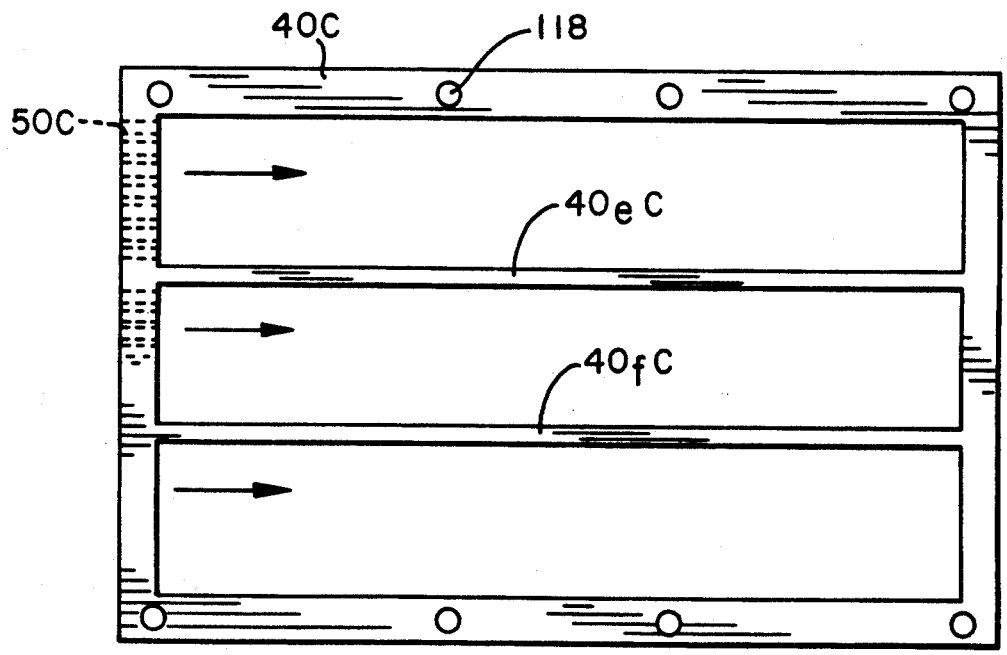
FIG. 11 is a top view of an inlet cell of FIG. 10.

Disposed within the plenum 100 is a self-contained filter arrangement 28C, which is shown in more detail in FIG. 10. The filter arrangement 28C comprises an arrangement of inlet and outlet cells 40C, 42C, filter elements 44C, and support screens 59C, similar to those shown in FIGS. 2-4. To compress the components of the filter arrangement, the components are provided with a plurality of openings 118, similar to the holes 68 and holes 70 in the embodiment shown in FIGS. 2-4.

Figure 9:
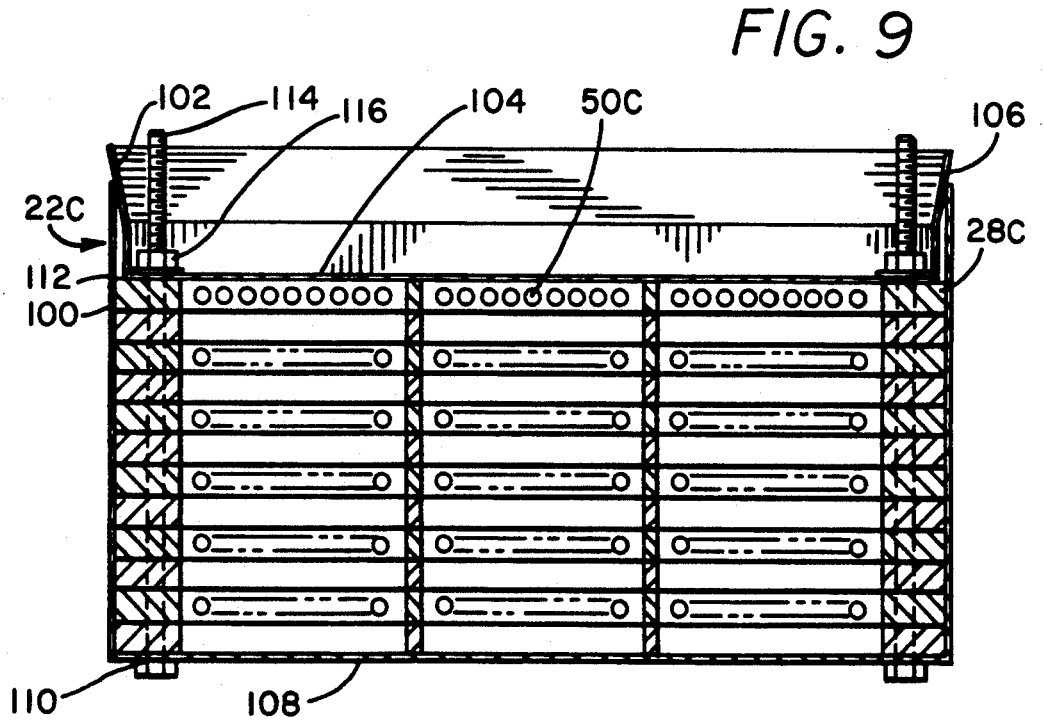
FIG. 9 is a cross-sectional view of the filter system taken along line 9—9 in FIG. 8.

As shown in FIG. 9, the assembly bolts 114 may be inserted through the openings 110 in the lower surface 108 of the plenum 100, the openings 118 of the filter arrangement 28C, and the openings 112 in the topplate 102 and the nuts 116 tightened down to assemble the filter system 20C. In this embodiment, the system 20C may be assembled without the use of gaskets, as the filter arrangement 28C seats directly against the lower surface of the plenum 100 and the topplate 102, and tightening the assembly bolts 114 and nuts 116 compresses the assembly, including the filter elements 44C, cells 40C, 42C, and support screens 59C. This type of arrangement provides easier maintenance and extends the life of the system 20C.

Alternate methods of sealing the arrangement may be utilized that do not necessarily provide for easy field maintenance. For example, a method of sealing porous metal support screens and sintered filters is by swaging the edges with a forming press and dies. Alternately, metal edges may be sealed by welding.

Returning now to the filter arrangement 28C shown in FIGS. 9-10, it may be seen that the inlet apertures 50C and outlet apertures (not shown) are round. The inlet and outlet cells 40C, 42C may be more easily understood with reference to FIG. 11, which shows an inlet cell 40C. It will be appreciated, however, that the outlet cell 42C may be of a similar construction. During operation, gas enters the cell 40C through the apertures 50 and flows parallel to the support members 40eC-40fC, passes through the support screens 59C and the filter element 44C, and enters the outlet cell 42C to be passed out of the filter arrangement 28C.

Figure 12:
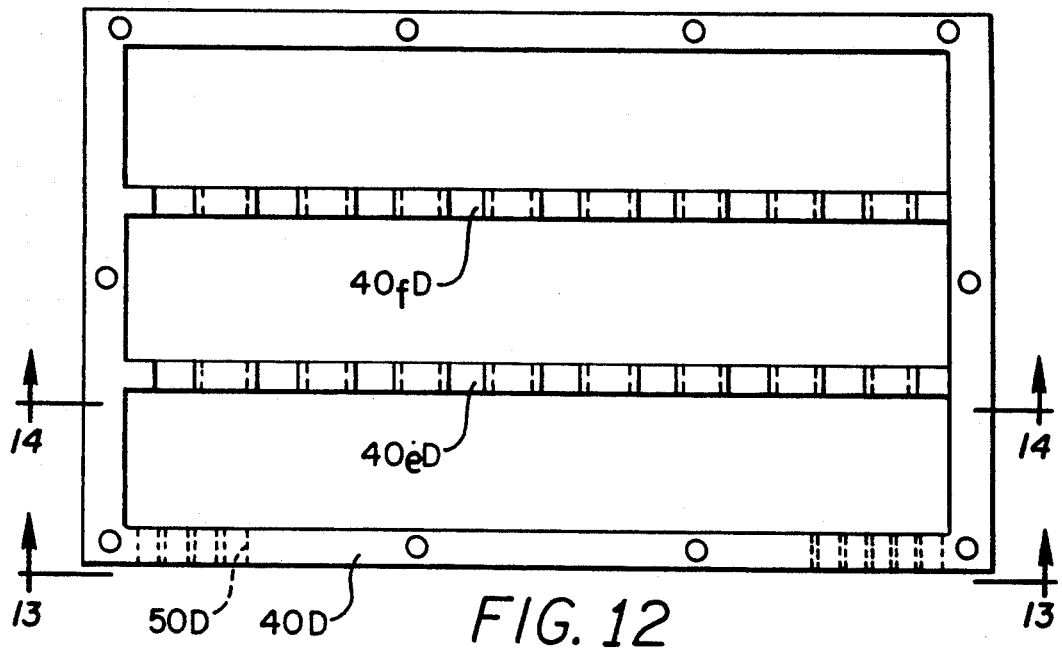
FIG. 12 is a top view of an alternate embodiment of inlet cell.
Figure 13:
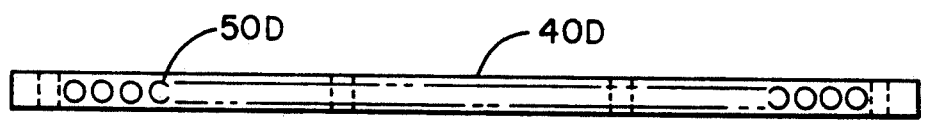
FIG. 13 is a side view of the inlet cell taken along line 13—13 of FIG. 13—13.
Figure 14:
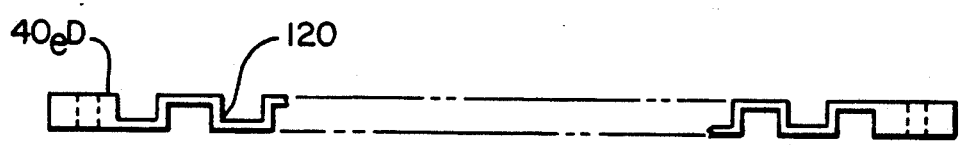
FIG. 14 is a side view of the inlet cell taken along line 14—14 of FIG. 14—14.

An alternate inlet/outlet cell 40D arrangement is shown in FIGS. 12-14. In this arrangement, gas enters the cell 40D through apertures 50D. As illustrated in FIG. 13, the apertures are round; the apertures, however, may be of an alternate configuration. It will be appreciated that in this configuration, rather than flowing parallel, the gas flows through the cell 40D substantially perpendicularly to the support members 40eD-40fD.

Therefore, in order to provide a smooth flow of gas through the cell 40D, the support members 40eD-40fD are of a configuration that permits the gas to flow perpendicularly past the support member. Although alternate designs may be appropriate, the "alternating step" design shown in FIG. 14 is particularly suitable for permitting gas flow past the support member 40eD-40fD by way of openings 120.

Thus, during operation, gas flows into the cell 40D through the apertures 50D. The gas may then flow directly through the adjacent support screens and filter element (not shown), or, may pass one or more support members 40eD-40fD by way of openings 120 and then flow through the adjacent support screens and filter element. It will be appreciated that if the gas flows past only one support member 40eD of the inlet cell 40D or flows directly through the adjacent support screens and filter element, the gas must pass similar one or more similar support members of the outlet cell before flowing out of the apertures of the outlet cell (not shown).

Figure 15:
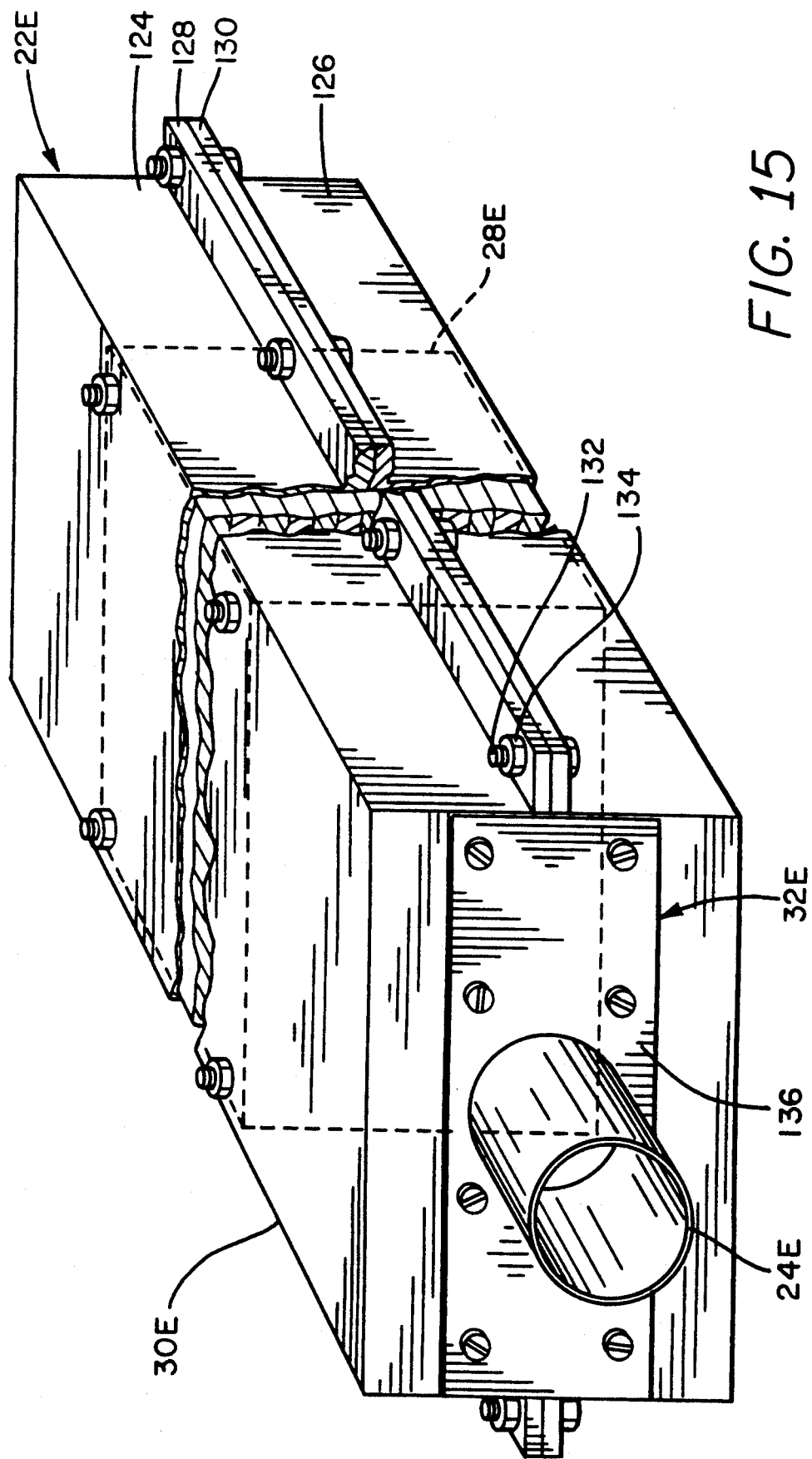
FIG. 15 is a perspective view of an alternate embodiment of the invention of FIG. 1.

A fifth embodiment of the invention is shown in FIG. 15. In this embodiment, the housing 22E comprises a substantially rectangularly shaped plenum 30E that is formed in two mating sections 124, 126 with outwardly extending flanges 128, 130. In order to secure the sections 124, 126 together, nuts 132 and bolts 134 are tightened together through openings in the flanges 128, 130. The housing 22E further comprises endplates 32E (the outlet endplate is substantially identical to the inlet endplate), which include a flat plate 136 from which extends an inlet pipe 24E or outlet pipe (not shown) for coupling to the exhaust system. The flat plate 136 is coupled to the plenum 30E by any appropriate method to provide a seal of the mating surfaces of the sections 124, 126. In the embodiment shown, the flat plate 136 is bolted to the plenum 30E. The filter arrangement 28E may be of any of the designs discussed above.

In summary, the invention provides an improved exhaust filter system for a diesel engine. Each of the embodiments set forth utilizes materials that are highly resistant to heat. Consequently, the exhaust filter is regenerable. Further, the particular materials utilized maximize the efficiency of the filter while minimizing the resultant pressure drop across the filter, and, therefore, minimizes the effect of the filter on engine performance. The filter is of an uncomplicated design that may be easily assembled and disassembled in the field so that the filter system may be easily serviced.

I claim as my invention:

1. An exhaust gas filter assembly for removing particulates from the exhaust gas of an engine, comprising, in combination:

a housing having an inlet pipe and an outlet pipe and defining an exhaust gas flow path between the inlet pipe and the outlet pipe, the inlet pipe being coupled to the engine to receive exhaust gas therefrom and the outlet pipe being opened to the atmosphere and a self-contained filtering means operatively associated with the housing to communicate with the gas flow path, said filtering means including a plurality of inlet cells, each including frame members defining an internal space, at least one of the frame members having an end wall which includes at least one inlet aperture communicating with the internal space, a plurality of outlet cells, each including frame members defining an internal space, at least one of the frame members having an end wall which includes at least one outlet aperture communicating with the internal space, a plurality of generally planar, microporous filter elements for removing particulate contaminants from the exhaust gas, the filter elements being able to withstand high temperatures and compressible between the inlet and outlet cells, and a plurality of generally porous planar filter support elements disposed adjacent the microporous filter elements to provide support thereto, said inlet and outlet cells being alternately arranged with at least one filter element and at least one filter support element disposed between each inlet cell and outlet cell, said filtering means further including means for sealingly compressing the filter elements and the filter support elements and the inlet cells and the outlet cells between impervious end means whereby the gas flows from the inlet aperture to the outlet aperture through the filter element and the filter support element and wherein the inlet and outlet cells, the microporous filter elements, the filter support elements, the impervious end means, and the sealing means are of materials that are resistant to high temperatures such that the filtering means may be regenerated by heat.

2. The exhaust gas filter assembly of claim 1 wherein the housing comprises a generally rectangularly shaped parallelpiped and at least one housing closure plate removably coupled thereto, the housing closure plate being removable to provide access to the self-contained filtering means.

3. The exhaust gas filter assembly of claim 1 wherein the end means includes opposite endplates with corresponding holes, wherein the inlet and outlet cells are generally rectangular and include holes in at least one corner, and wherein the compressing means includes rod means extending through the holes in the endplates, inlet cells, and outlet cells, and through the holes in the filter elements and further includes connector means attached to the rod means for providing the desired compression.

4. The exhaust gas filter assembly of claim 1 wherein the microporous filter elements comprise graded filter materials.

5. The exhaust gas filter assembly of claim 1 wherein the microporous filter elements comprise quartz.

6. The exhaust gas filter assembly of claim 5 wherein the support elements comprise wire mesh.

7. The exhaust gas filter assembly of claim 6 wherein the wire mesh is sintered.

8. The exhaust gas filter assembly of claim 1 wherein the filter support elements comprise wire mesh.

9. The exhaust gas filter assembly of claim 8 wherein the wire mesh is sintered.

* * * * *